(12) United States Patent
Sekimori et al.

(10) Patent No.: US 6,192,761 B1
(45) Date of Patent: Feb. 27, 2001

(54) SENSOR CHIP, LAMINATED WAFER FOR SENSOR CHIP AND MANUFACTURING METHOD OF SENSOR CHIP

(75) Inventors: Yukimitsu Sekimori; Seiichi Yokoyama; Fumio Kaise, all of Tokyo (JP)

(73) Assignee: Nagano Keiki Co. Ltd., Tokyo (JP)

( * ) Notice: Subject to any disclaimer, the term of this patent is extended or adjusted under 35 U.S.C. 154(b) by 0 days.

(21) Appl. No.: 09/282,802

(22) Filed: Mar. 31, 1999

(30) Foreign Application Priority Data

Apr. 1, 1998 (JP) .................................................. 10-088682

(51) Int. Cl.$^7$ ................................. G01L 9/00; G01L 9/16
(52) U.S. Cl. ................................................................ 73/754
(58) Field of Search ............................... 73/754, 718, 719, 73/720, 721, 724, 726, 727; 438/50, 689, 690, 694, 695, 584, 589, 597

(56) References Cited

U.S. PATENT DOCUMENTS 5,917,264 * 6/1999 Maruno et al. .......................... 73/718

FOREIGN PATENT DOCUMENTS 10-82709  3/1998  (JP) .

OTHER PUBLICATIONS

U.S. Application No. 08/922 507, filed Sep. 3, 1997, now U.S. Patent No. 5,917,264 (Issued Jun. 29, 1999).

* cited by examiner

*Primary Examiner*—William Oen
(74) *Attorney, Agent, or Firm*—Flynn, Thiel, Boutell & Tanis, P.C.

(57) ABSTRACT

In a pressure sensor chip (10), an extension (42) is provided on a lower glass (40) and a signal receiving portion (50) of a conductive layer is formed from a surface (42A) of an extension (42) to an upper surface (30B) of an upper glass (30). Accordingly, the signal receiving portion (50) does not touch a circuit substrate when the pressure sensor chip (10) is mounted to the circuit substrate and the like, thereby preventing electric failure such as noise pickup of the signal receiving portion (50). Further, since the signal receiving portion (50) is formed by the conductive layer, no particular space for receiving electric potential from a diaphragm is necessary, thereby enabling size reduction of the pressure sensor chip (10). Since an anodic-bonding electrode (83) is disposed on a border (62) and is cut and removed in separating as the pressure sensor chip (10), visual check is not obstructed and contamination by being peeled-off can be prevented.

11 Claims, 11 Drawing Sheets

SENSOR CHIP, LAMINATED WAFER FOR SENSOR CHIP AND MANUFACTURING METHOD OF SENSOR CHIP

BACKGROUND OF THE INVENTION

1. Field of the Invention

The present invention relates to a sensor chip (semiconductor component for sensors) used for sensors for measuring pressure, acceleration, flow rate, temperature and the like, manufacturing method of the sensor chip and a laminated wafer used for manufacturing the sensor chip.

2. Description of Related Art

Japanese Patent Application Laid-Open No. Hei 8-235387 discloses a sensor chip used, for example, for electro-capacitance type pressure sensor.

The chip has a laminated structure where an electrode layer 200 is sandwiched between two glass substrates 201 and 202. As shown in FIG. 15, the electrode layer 200 is composed of a conductive silicon substrate and has a thick portion 200B around thin diaphragm 200A. The first glass substrate 201 and the second glass substrate 202 is bonded to the peripheral thick portion 200B. A predetermined gap is respectively formed between the respective glasses 201, 202 and the diaphragm 200A because the diaphragm 200A is thin relatively to the thick portion 200B.

When pressure is applied from a pressure inlet (not shown) provided to the second glass substrate 202 in the chip, the diaphragm 200A bends toward the first glass substrate 201 by the pressure from the second glass substrate 202. An electrode (not shown) is disposed on the first glass substrate 201 opposing the diaphragm 200A and electro-capacitance between the electrode and the diaphragm 200A changes when the diaphragm 200A bends. The pressure can be measured by electrically processing the change in the electro-capacitance.

For conducting such electric processing, respective signal receiving portions 203 and 204 for taking out electric potential of the electrodes (usually provided in plural) disposed on the first glass substrate 201 through a through-hole and another signal receiving portion 205 for taking out electric potential of the diaphragm 200A through the side of the chip are provided on a surface of the first glass substrate 201 (remote from the electrode layer 200). The signal receiving portions 203 to 205 and an outside circuit substrate for signal-processing are wired by wire-bonding etc. In the signal receiving portions 203 to 205, the signal receiving portion 205 for the diaphragm 200A has a terminal 205A provided in advance on the first glass substrate 201 and a continuous conductive layer 205B connecting the terminal 205A and an end of the thick portion 200B of the silicon substrate exposed on a side of the sensor chip. The conductive layer 205B is formed by vapor deposition, thermal spraying etc.

However, since the conductive layer 205B of the signal receiving portion 205 stretches to a lower end (a periphery of the second glass substrate 202 remote from the diaphragm 200A) of the sensor chip, the circuit substrate touches the conductive layer 205B when the chip is mounted to the circuit substrate, thereby causing possible electric failure such as noise pickup.

For overcoming above disadvantage, some special jig may be used for vapor deposition to prevent the conductive layer 205B from stretching to the lower end of the lower glass 201.

However, the structure of the jigs can be too complicated in the above arrangement, thereby making the attachment of the chip difficult. Additionally, since the small chip has to be carefully handled by a pair of tweezers and the like and the chips are collectively produced from a single wafer by a order of some hundreds pieces when the chip is attached to the jig, enormous time is necessary for attaching all the chips.

In order to cope with the electric failure and the disadvantage in productivity according to the structure shown in FIG. 15, another sensor chip is proposed, in which the thick portion 200B of the silicon substrate is exposed by a cut 206 as shown in FIG. 16 and the signal of the diaphragm 200A is directly taken out therefrom.

Such sensor chip can be manufactured by following steps of: drilling an opening of circular shape, for example, to the first glass substrate 201 in advance; forming the laminated wafer for sensor chip by laminating the first glass substrate 201 to the silicon substrate; and cutting the wafer at the position crossing the opening. According to the sensor chip, since the upper side of the silicon substrate exposed by the cut 206 is used as the signal receiving portion, the signal receiving portion is not required to be provided around the side of the chip, thereby making the vapor deposition on the side of the chip (cut surface exposed by cutting the wafer) unnecessary. Accordingly, when the signal receiving portion is formed, the vapor deposition can be done in the state of the wafer, i.e. without being cut into respective chips for forming the signal receiving portion, thereby greatly facilitating the attachment of the jigs and the like in vapor depositing step.

However, since the surface of the electrode layer 200 of the sensor chip exposed by the cut 206 forms a signal receiving portion as shown in FIG. 16, the size of the sensor chip increases. In other words, the surface of the electrode layer 200 exposed by the cut 206 has to be of a certain size for bonding and the like. However, the thick portion 200B used for the signal receiving portion also works for bonding the respective glass substrate 201 and 202 on the periphery of the diaphragm 200A. Accordingly, it is difficult to secure an area for the signal receiving portion to ensure the bonding strength and the electrode has to be extended to the outside. The above disadvantage is especially prominent in making a square diaphragm in line with the ordinarily square glass substrates 201 and 202, thereby eliminating useless area to increase area utilization efficiency for improving responsivity.

On the other hand, for overcoming the size-increase problem in the sensor chip shown in FIG. 16, though the electrode layer 200 is exposed by the cut 206, the signal receiving portion may be formed on the surface of the first glass substrate 201 as in FIG. 15, thereby connecting respective portions by the conductive layer 205B formed by vapor deposition etc.

However, following disadvantage occur in the above arrangement.

First, since the opening based on which the cut 206 is formed, is desirably formed as small as possible in forming the conductive layer 205B, it is difficult to conduct vapor deposition to the opening on the wafer, so that sufficient conductive layer 205B is not formed toward the bottom. Especially, the conductive layer 205B is likely to be discontinued at a corner of the bottom surface, as shown in FIG. 17.

Further, a break or a roll is likely to be generated to the edge portion around the opening 207 for the cut 206 previously formed on the first glass substrate 201. In this case, the aforesaid discontinuation of the conductive layer 205B is more likely to be caused since the break etc. forms concave when the first glass substrate 201 is laminated to the electrode layer 200.

In addition, the aforesaid conventional sensor chip has a disadvantage accompanied by anodic bonding electrode as well as the above-described disadvantage of signal receiving portion.

In the conventional sensor chip, a plurality of layers such as glass substrates and silicon substrates are laminated and often bonded by the anodic bonding. The anodic bonding is a bonding technique, in which a high electric voltage is applied to, for example, the fuirt glass substrate 201 and the electrode layer 200 under high temperature to bond them. In some cases, the plurality of layers is collectively anodic-bonded.

For conducting the anodic-bonding, an anodic-bonding electrode 208 is formed on the surface of the first glass substrate 201 in the sensor chip shown in FIG. 15.

The anodic-bonding is conducted in an area of the thick portion 200B where the first glass substrate 201 and the electrode layer 200 touches. The anodic-bonding electrode 208 has an approximately identical configuration as a profile of the diaphragm 200A for the anodic-bonding.

This is because the bonding strength increases as getting close to the anodic-bonding electrode 208 and the bonding strength is necessary to a portion of the thick portion 200B most adjacent to the diaphragm 200A. However, a partial curved detour in view of the position of other electrodes and through-holes and a partial cut for passing the conductor is provided as necessary.

Such anodic-bonding electrode 208 is not removed and is retained on the first glass substrate 201 even after being manufactured as a sensor chip.

However, following disadvantages can occur when the anodic-bonding electrode 208 is retained.

First, in the sensor chip manufactured by the aforesaid anodic-bonding, a confirmation process is necessary for checking whether there is bonding failure (insufficient bonding, mixing foreign substance etc.). The confirmation work is done by visually checking the anodic-bonding surface looking through the first glass substrate 201. Accordingly, when the anodic-bonding electrode 208 is retained on the first glass substrate 201, the anodic-bonding electrode 208 can be an obstacle for the visual confirmation, so that the anodic-bonded surface has to be observed in a multiple of directions obliquely, thereby largely deteriorating work efficiency. Further, since the anodic-bonding electrode 208 visually blocks, using automation machinery is impossible for improving work efficiency.

Second, when the anodic-bonding electrode 208 is retained on the sensor chip, a part of the anodic-bonding electrode 208 can be peeled off to cause contamination problem and removing work can be troublesome for marketing as a pressure sensor. This is thought to be because sodium ion in the first glass substrate 201 concentrates around the anodic-bonding electrode 208 by applying a minus-electric voltage in anodic bonding process so that the sodium ion is educed to deteriorate the electrode base member, making it easy to be peeled off even when the anodic bonding electrode 208 is firmly formed, which is an inevitable problem as long as the anodic-bonding electrode 208 is retained.

SUMMARY OF THE INVENTION

An object of the present invention is to provide a sensor chip, in which the electric failure can be avoided and size thereof can be reduced.

A sensor chip according to the present invention has laminated first substrate and second substrate, an electrode layer being sandwiched between the first substrate and the second substrate, and a signal receiving portion provided on a surface of the first substrate remote from the electrode layer, the signal receiving portion being led from the electrode layer. The sensor chip is characterized in that the second substrate has an extension projected therefrom, the extension being stretched beyond an end of the first substrate, and that a conductive layer is continuously formed from a surface of the extension on the first substrate side to the surface of the first substrate through the end of the first substrate. The conductive layer forms the signal receiving portion.

The conductive layer may preferably be formed by a vapor deposition or a thermal spraying of a metal base member.

According to the present invention, since an extension is provided on the second substrate and the conductive layer as the signal receiving portion extends from the surface of the extension on the first substrate side to the surface of the first substrate, the conductive layer does not reach the end of the second substrate remote from the electrode layer. Therefore, even when the sensor chip is mounted to the circuit substrate from the second substrate side, the substrate and the conductive layer are not electrically connected, thereby preventing electric failure caused therefrom.

Though the conductive layer has a crossing portion on the surface of the extension on the first substrate side and the end of the electrode layer and the first substrate, since the conductive layer is continuously and flatly formed from the end of the first substrate to the electrode layer, the conductive layer extending thereover can be securely continued, thereby preventing the electric failure on this part.

Since bonding for connecting the outside is done on the signal receiving portion on the surface of the first substrate, a large cut and the like is not necessary for directly bonding the electrode layer, thereby reducing the size of the sensor chip. Further, since the extension is only required to have the surface facing the electrode layer for receiving the conductive layer as the signal receiving portion and only slight protrusion is necessary, the size of the chip can be reduced.

In the present invention, the extension is preferably 0.1 to 0.9 times as long as a distance from the surface of the extension on the first substrate side to the surface of the first substrate (total thickness of the electrode layer and the first substrate when the surface of the extension corresponds to the surface of the second substrate on the electrode layer side).

Further, in the above arrangement, the electrode layer preferably has a deformable diaphragm, the diaphragm forming a pressure sensor chip together with the first substrate and the second substrate.

Another object of the present invention is to provide a laminated wafer suitable for manufacturing the above-described sensor chip according to the present invention.

The laminated wafer according to the present invention has a base member of the second substrate large enough to allocate a plurality of the sensor chip, a laminate of the electrode layer and the first substrate arranged on the second substrate base member mutually spaced apart by a groove of a predetermined width, and a conductive layer formed from a bottom of the groove to the surface of the first substrate through an end of the electrode layer and the first substrate facing the groove.

The groove between the laminate of the electrode layer and the first substrate may be formed by arranging the laminate of the electrode layer and the first substrate of a size corresponding to the sensor chip, thereby forming a gap therebetween as the groove. Alternatively, a large size of the first substrate base member, the electrode layer base member and the second substrate base member large enough to allocate a multiple of sensor chips may be laminated and a cut of a predetermined width may be formed by the depth from the first substrate side to the electrode layer base member to form the groove.

According to the present invention, the sensor chip having laminated first substrate, electrode layer and second substrate can be formed by cutting the bottom of the groove (the second substrate base member). The bottom of the groove forms the extension of the second substrate after being cut and the conductive layer forms a signal receiving portion extending from the surface of the extension on the electrode layer side to the surface of the first substrate via the end of the electrode layer and the first substrate.

Accordingly, the above-described sensor chip of the present invention can be easily manufactured, and the aforesaid effects of avoidance of electric failure and size reduction can be obtained for the sensor chip.

In the present invention, the predetermined width of the groove is preferably 0.5 to 2.0 times as wide as a depth of the groove.

Still another object of the present invention is to provide a manufacturing method of the sensor chip, in which the sensor chip can be efficiently manufactured.

The manufacturing method of a sensor chip according to the present invention is for manufacturing the above-described sensor chip. The method is characterized in having the following steps of: forming a laminated wafer having base member of the second substrate and an array of a laminate of base member of the electrode layer and the first substrate disposed on the second substrate base member at a predetermined interval; applying a cover to the laminated wafer, the cover having a cut with a pattern corresponding to a configuration of the signal receiving portion, to expose a part of inside of the groove and a part of the surface of the first substrate base member along the groove from the cut; vaporizing and supplying a vapor deposition base member having conductivity to the cut to form a conductive layer extending continuously from a bottom of the groove exposed from the cut to the surface of the first substrate base member through a side thereof; and cutting an approximate center of the groove in width direction thereof with a smaller width than the width of the groove to divide into respective sensor chips.

Accordingly, since the signal receiving portion of respective chips are formed by vapor depositing the groove of the laminated wafer and cutting the groove, the handling is facilitated as compared with the conventional art in which respective chips are attached to jigs, thereby largely reducing time required for vapor deposition.

In the present invention, the forming laminated wafer step preferably further includes the steps of: laminating the second substrate base member large enough to allocate a plurality of sensor chip, the electrode layer base member and the first substrate base member; and forming the groove from the first substrate base member side to the electrode layer base member along a border of the sensor chip.

Accordingly, the wafer having the electrode layer and the first substrate arranged at a predetermined interval can be manufactured easily.

In the present invention, the laminated wafer is preferably formed by locating at least four sensor chip sections to the laminated wafer so that respective corners of the sections concentrate to single point and by forming the groove along a border to divide the sensor chip sections into two pairs having at least two sections in the laminated wafer forming step. And, in the cover applying step, the cut of the cover preferably extends over the point where the four sensor chip sections concentrate and further extends continuously to the first substrate base member surfaces on both sides of the groove extending along the border. And the laminated wafer is preferably cut both along a center of the groove and in a direction intersecting the groove at the concentrating point of the corners to divide the conductive layer into four to form the signal receiving portion for each sensor chip sections after the conductive layer forming step.

Accordingly, the signal receiving portion can be formed on the four sensor chips by a single vapor deposition, thereby further enhancing production efficiency.

In the present invention, the conductive layer may be divided by a cutting tool, and the second substrate base member may be cut by the cutting tool subsequently to the conductive layer dividing step.

Accordingly, respective sensor chips can be efficiently separated from the laminated wafer.

Incidentally, when a combined chip having integral plurality of chips, the laminated wafer can be cut on the border except for the groove.

In the above, the width of the groove is preferably set 0.5 to 2.0 times as long as the depth thereof.

Further object of the present invention is to overcome the problem of the remaining anodic-bonding electrode in the above-described manufacturing method of the sensor chip and the laminated wafer for the sensor chip of the present invention.

Specifically, the manufacturing method according to the present invention is characterized in forming a plurality of sensor chip section on the laminated wafer and disposing an anodic-bonding electrode on the border, and cutting and removing the anodic-bonding electrode in cutting each section as the sensor chip after being used for anodic-bonding.

Further, the laminated wafer of the present invention is characterized in that an anodic-bonding electrode is disposed on a border of each section on the laminated wafer having a plurality of sensor chip section.

In the above, the anodic-bonding electrode preferably surrounds each section for approximately an entire circumference thereof and more than 60% of a length of the anodic-bonding electrode is preferably located on the border.

Further, the anodic-bonding electrode is preferably thinner than a cut width in cutting off each section along the border.

Accordingly, there is no or little of the anodic-bonding electrode remained on the sensor chip after being separated as the sensor chip, so that the anodic-bonding check is not obstructed and the problem of the contamination caused by peel-off and removal thereof can be overcome.

DETAILED DESCRIPTION OF PREFERRED EMBODIMENT(S)

Preferred embodiments of the present invention will be described below with reference to drawings.

[First Embodiment]

Figure 1:
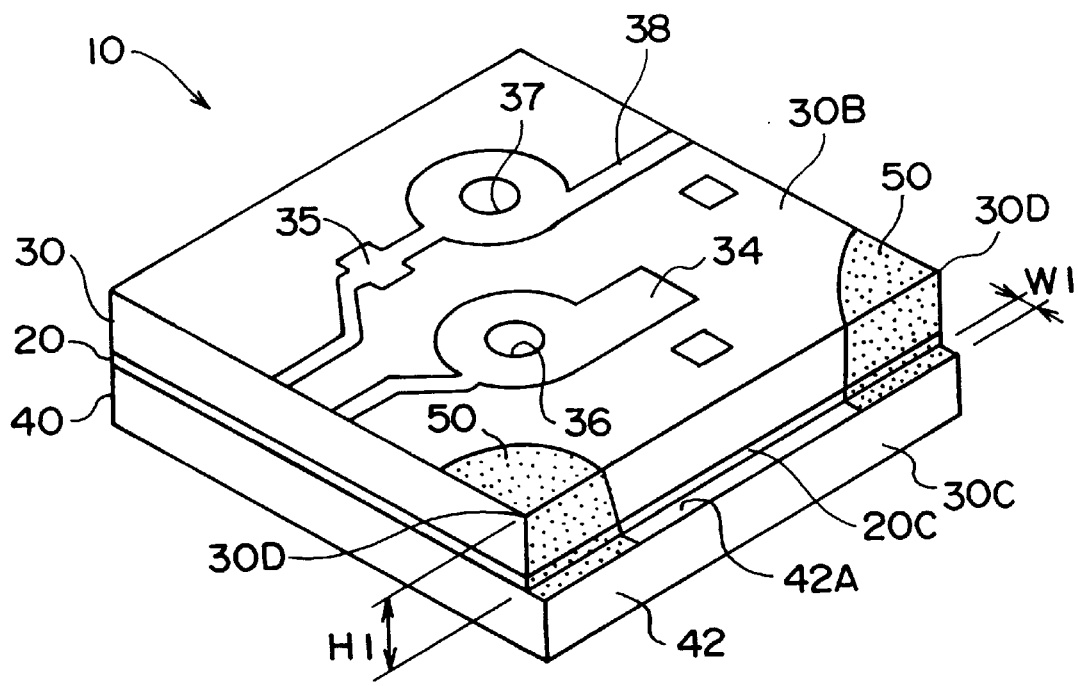
FIG. 1 is an entire perspective view showing a sensor chip according to first embodiment of the present invention.
Figure 6:
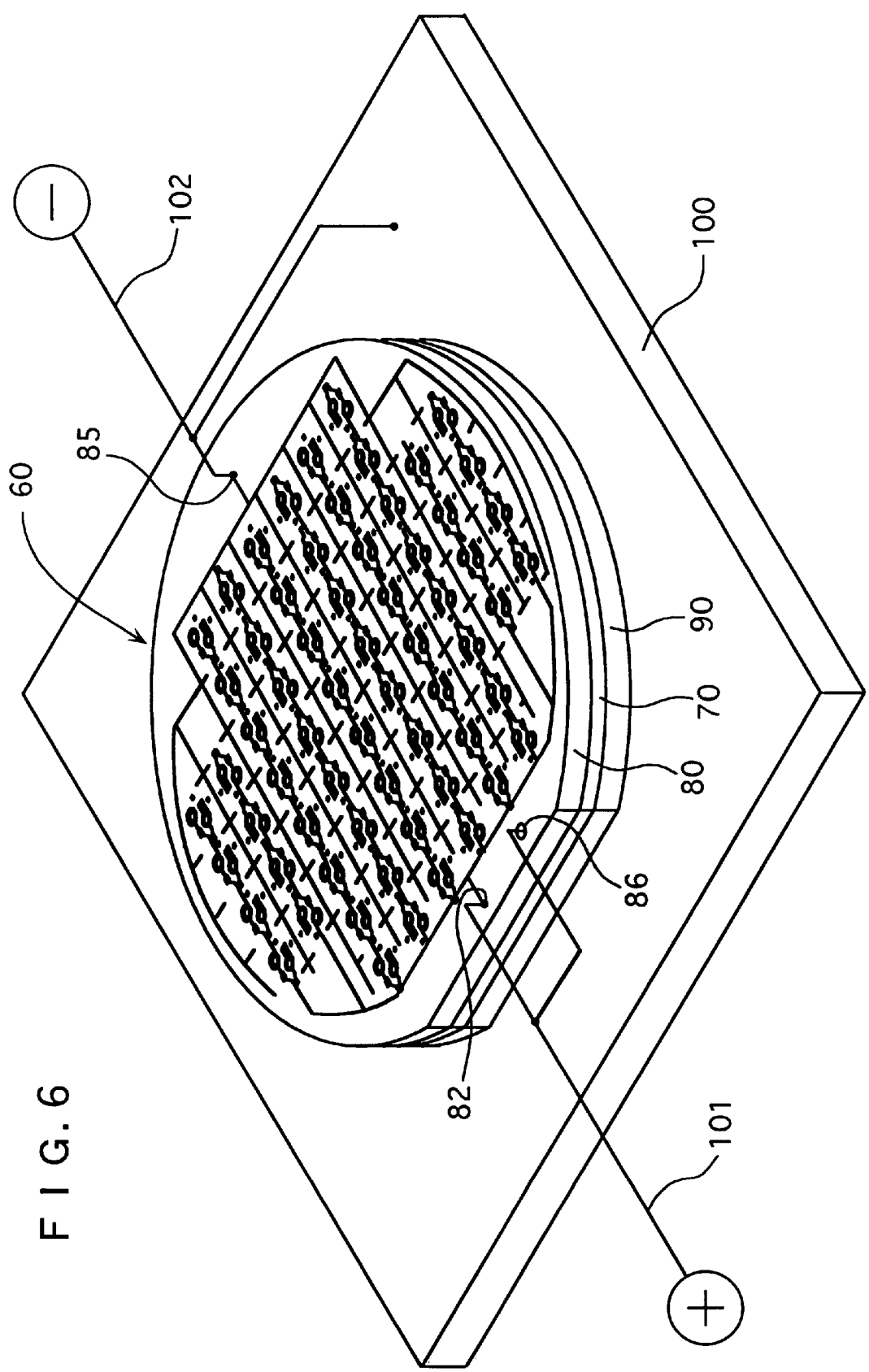
FIG. 6 is a perspective view showing a laminated wafer and handling thereof in manufacturing the sensor chip of FIG. 1.

The present embodiment relates to a pressure sensor chip 10 to which the present invention is applied. The pressure sensor chip 10 is an electro-capacitance type pressure sensor chip in which the pressure is detected as a change in electrostatic capacitance, the pressure sensor chip being a laminated chip in practical use as shown in FIG. 1. The pressure sensor chip 10 is manufactured collectively in plural as a laminated wafer 60 as shown in FIG. 6, and is cut in the form shown in FIG. 1.

An arrangement of the pressure sensor chip 10, an arrangement of the laminated wafer 60 and specific steps for manufacturing the pressure sensor chip 10 from the laminated wafer 60 will be described below.

[Pressure Sensor Chip]

Figure 2:
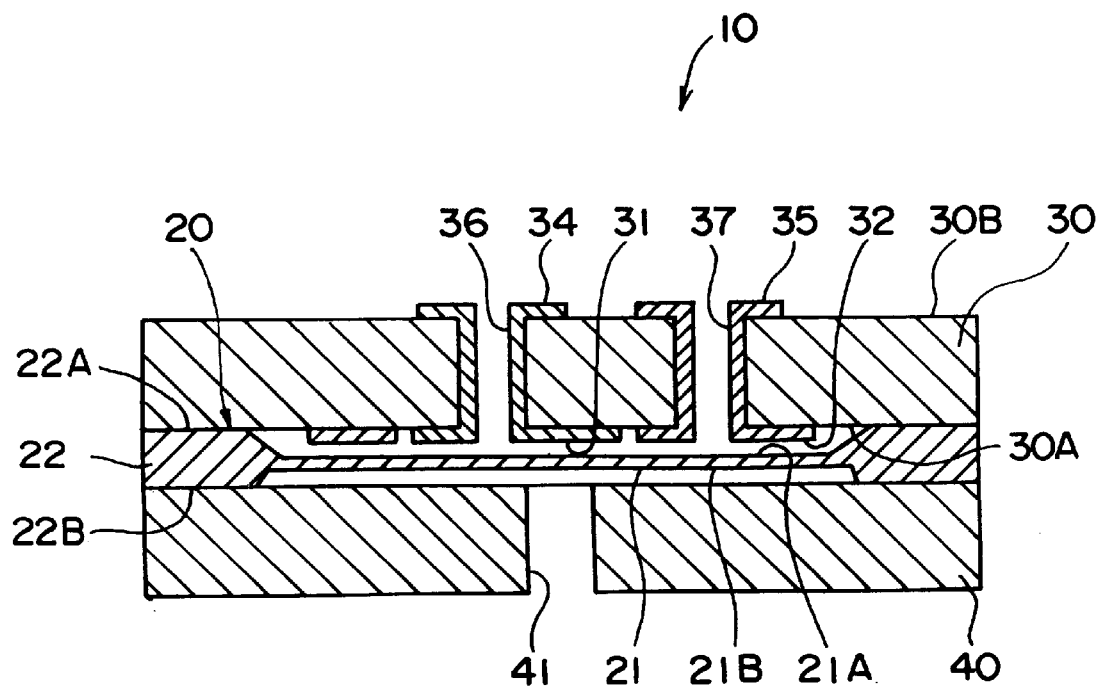
FIG. 2 is an end view taken along II—II line of FIG. 5 showing the sensor chip of FIG. 1.
Figure 3:
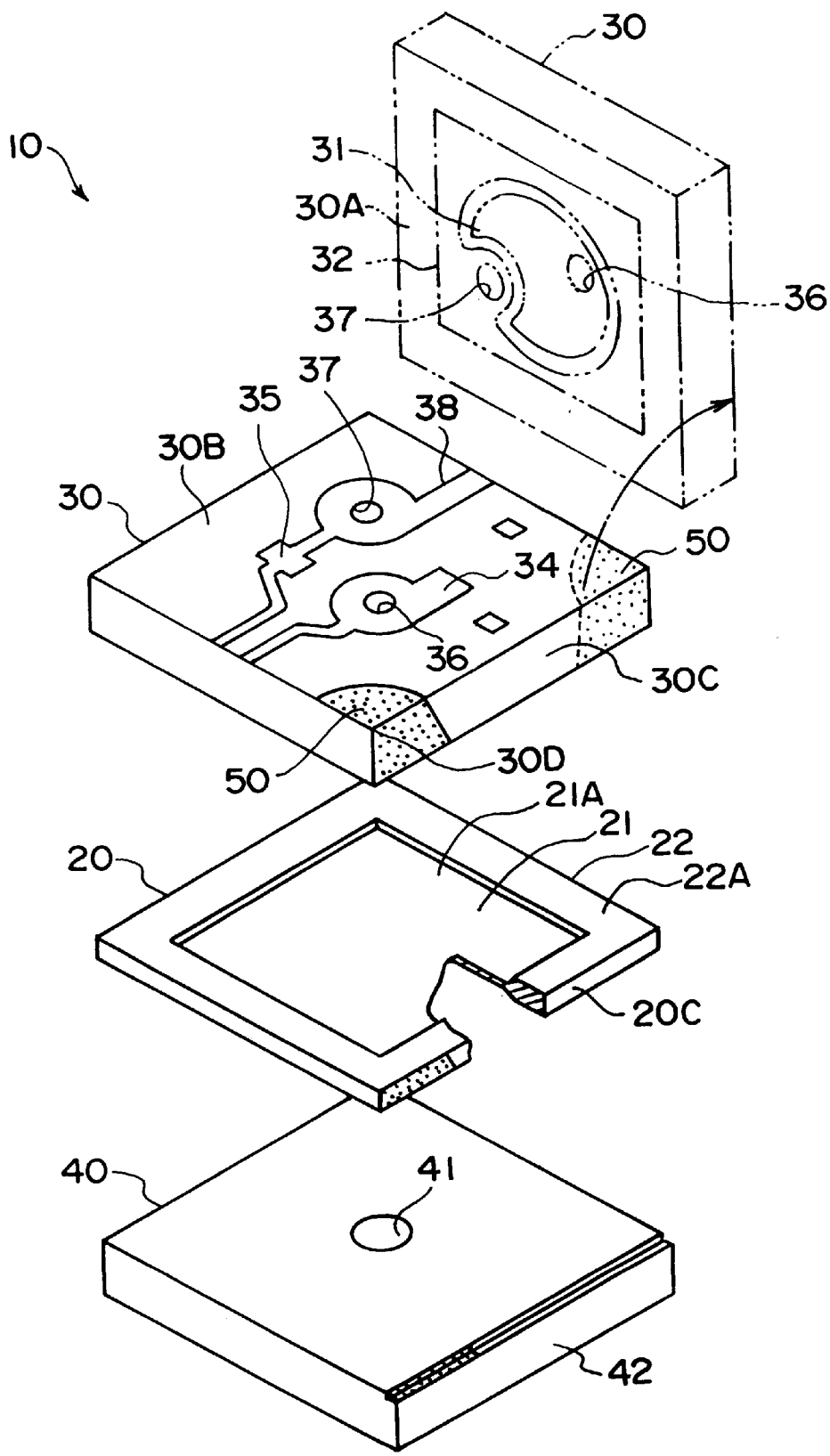
FIG. 3 is an exploded perspective view showing the sensor chip of FIG. 1.

As shown in FIGS. 1 to 3, the pressure sensor chip 10 includes an upper glass 30 as first substrate, a lower glass 40 as second substrate and an electrode layer 20 sandwiched between them.

The electrode layer 20 is made of conductive silicon, the periphery thereof being a thick portion 22 which is relatively thick and inside thereof being a relatively thin diaphragm 21.

In the diaphragm 21, the opposed face 21A on the upper glass 30 side is depressed relatively to an upper face 22A of the thick portion 22, in which step dimension from the opposed face 21A to the upper face 22A of the thick portion 22 is, for example, approximately 2 to 8 μm. The opposed face 21B on the lower glass 40 side is depressed relatively to the lower face 22B of the thick portion 22 and the step dimension from the opposed face 21B to the lower face 22B is, for example, approximately 80 μm. However, the present invention is not limited to the specific value.

The electrode layer 20 is formed from approximately 0.1 mm thick silicon by etching respective extending portion with photoresist processing and the like.

The electrode layer 20, the upper glass 30 and the lower glass 40 are abutted through the thick portion 22 and the entire circumference is anodic-bonded with each other.

As mentioned above, since both sides of the diaphragm 21 is depressed as compared with the thick portion 22, a predetermined space is formed between the diaphragm 21, the upper glass 30 and the lower glass 40 in accordance with the depression.

Figure 4:
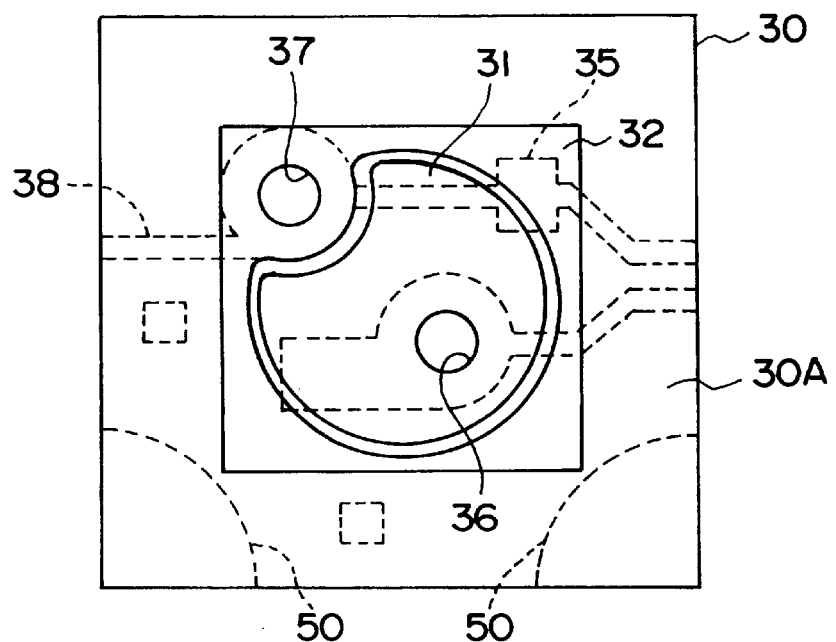
FIG. 4 is a bottom plan view showing an upper glass of the sensor chip of FIG. 1.
Figure 5:
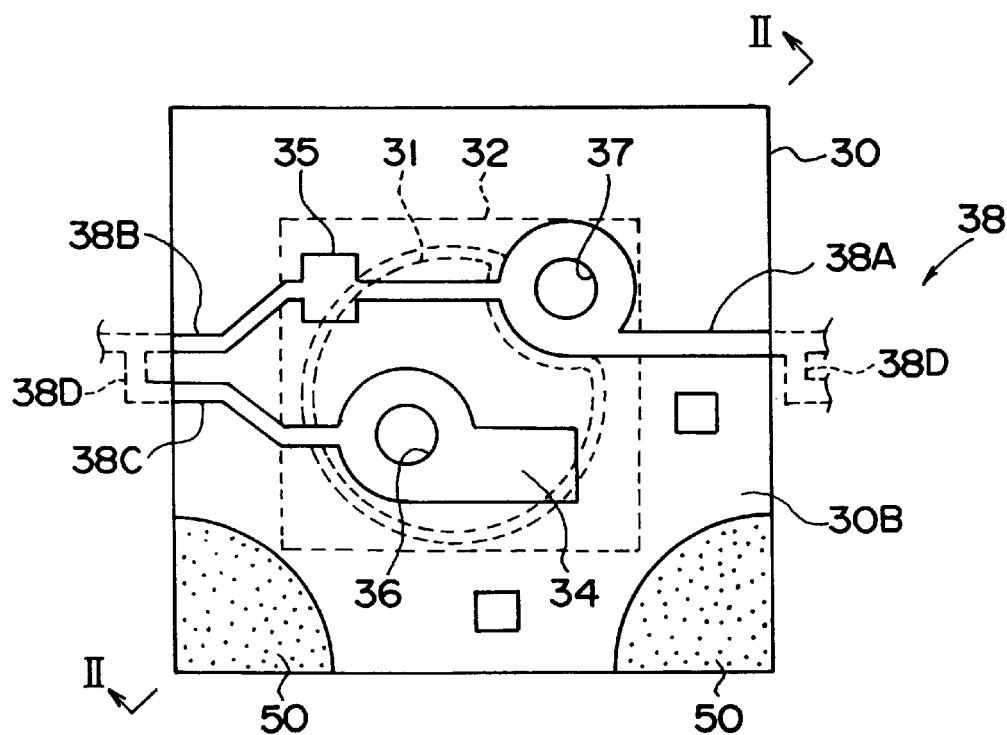
FIG. 5 is a top plan view showing the upper glass of the sensor chip of FIG. 1 (reversing FIG. 4 in left and right direction)

As shown in FIGS. 4 and 5, various arrangements are possible for the upper glass 30.

The upper glass 30 has a central electrode 31 and a peripheral electrode 32 surrounding the central electrode 31 on the opposed face 30A opposing the diaphragm 21. Signal receiving portions 34 and 35 are provided on a surface 30B of the upper glass 30 (opposite to the opposed face 30A). Through-holes 36 and 37 passing through both sides are formed on the upper glass 30.

The through-hole 36 is intercommunicated with the central electrode 31 and is connected to the signal receiving portion 34 at the surface of the upper glass 30. The through-hole 37 is intercommunicated to the peripheral electrode 32 and is connected to the signal receiving portion 35 on the surface of the upper glass 30.

A leading portion 38 extending to the most adjacent periphery is formed to the signal receiving portion 35 and the through-holes 36 and 37. First leading portion 38A extends from the through-hole 37 oppositely to the signal receiving portion 35. Second leading portion 38B extends from the signal receiving portion 35 oppositely to the through-hole 37. Third leading portion 38C extends from the through-hole 36 parallel to the second leading portion 38B.

The second leading portion 38B and the third leading portion 38C is connected by fourth leading portion 38D on the laminated wafer 60 and are connected to the first leading portion 38A of the adjacent section. In other words, respective signal receiving portions 34 and 35, through-holes 36 and 37, the central electrode 31 and the peripheral electrode 32 of respective sections (chip section 61) as a pressure sensor chip 10 are sequentially and electrically connected with each other on the laminated wafer 60 (see FIGS. 6, 7 and 10. Described below in detail).

As shown in FIGS. 2 and 3, the lower glass 40 has a pressure inlet 41 penetrating approximately central position thereof, through which a pressure to be detected by a pressure sensor is impressed.

On one side of the lower glass 40, an extension 42 projected beyond an end of the electrode layer 20 and the upper glass 30 is provided, as shown in FIG. 1.

When the extension 42 is projected by a dimension of W1 and the height from a surface of the extension 42 to the surface of the upper glass 30 is H1, the protrusion W1 is 0.1 to 0.9 times as long as the height H1, more preferably 0.2 to 0.6 times as long as the height H1. When W1 is shorter than 0.1 times of the height H1, a cutting tool gets too close to respective sides of the electrode layer 20 and the upper glass 30 in cutting below-mentioned laminated wafer with a rotating cutting tool to obtain the pressure sensor chip 10, so that glass powder generated by the cutting is not discharged well. On the other hand, when W1 is longer than 0.9 times of the height H1, the size of the pressure sensor chip 10 gets too big, thereby largely diminishing the number of the pressure sensor chips obtained from a laminated wafer, so that productivity is deteriorated.

Back in FIG. 1, the pressure sensor chip 10 includes a signal receiving portion 50 extending from the electrode layer 20 to the surface of the upper glass 30, as well as laminated structure of above-described upper glass 30, the electrode layer 20 and the lower glass 40.

The signal receiving portion 50 is formed of a metal conductive layer of aluminum, gold, titanium etc. by vapor depositing to the above-described upper glass 30, the electrode layer 20 and the lower glass 40 being laminated. The signal receiving portion 50 is continuously formed from a surface 42A of the extension 42 provided on the lower glass 40 to the upper face 30B of the upper glass 30 via an end 20C of the electrode layer 20 and an end 30C of the upper glass 30. Though the signal receiving portion 50 is disposed on the upper face 30B of the upper glass 30 adjacently to two corners 30D close to the through-hole 36 and the signal receiving portion 34, only one of the signal receiving portion is used in being installed as a pressure sensor, which is selected in view of convenience in practical use etc.

In the pressure sensor chip 10, pressure is detected as follows.

When the pressure is applied to the pressure inlet 41, the diaphragm 21 is elastically deformed to curve, so that a distance between the diaphragm 21 and the central electrode 31 and the peripheral electrode 32 on the upper glass 30 is changed to change electrostatic capacitance in accordance with the distance, thereby measuring the pressure.

In this case, since the diaphragm 21 largely displaces around the center thereof and little on the periphery, a difference is caused in the electrostatic capacitance between the diaphragm 21 and the central electrode 31 and the peripheral electrode 32 of the upper glass 30. Accordingly, the pressure is more accurately detected by measuring difference between them to calibrate an error based on the change in temperature etc. and by removing noise etc.

The gap between the diaphragm 21 and the upper glass 30 of the pressure sensor chip 10 is made open to the atmosphere through the thorough-holes 36 and 37 and is maintained at the atmospheric pressure. Accordingly, the pressure sensor chip 10 can be used as a so-called gauge pressure (differential pressure relative to the atmospheric pressure when the atmospheric pressure is counted zero) sensor.

[Laminated Wafer]

Next, the laminated wafer 60 used for manufacturing the pressure sensor chip 10 will be described below.

Figure 7:
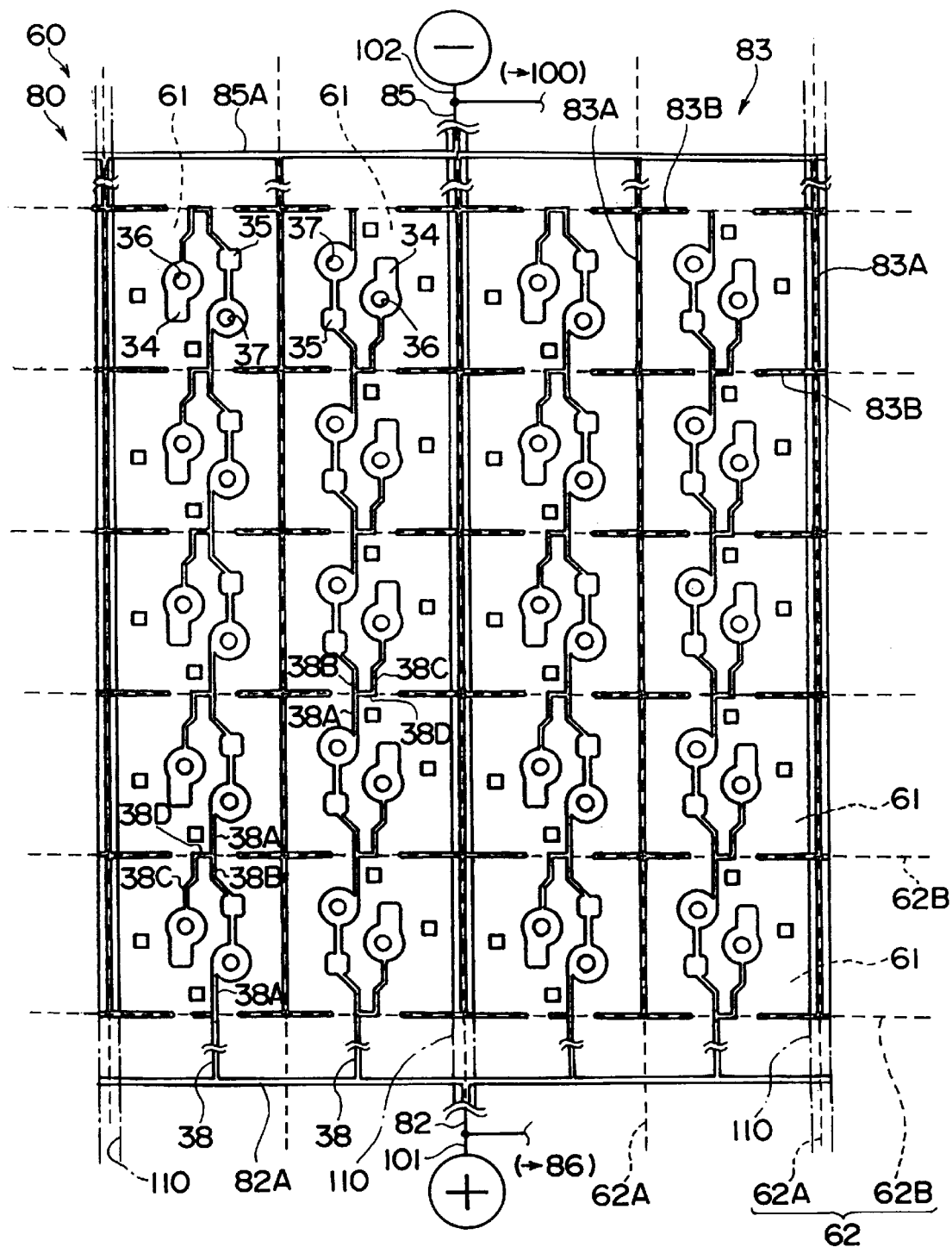
FIG. 7 is an enlarged top plan view showing surface pattern of the laminated wafer of FIG. 6.

In FIGS. 6 and 7, the laminated wafer 60 has glass first substrate base member 80, silicon electrode layer base member 70 and glass second substrate base member 90 being laminated with each other.

The first substrate base member 80, the electrode layer base member 70 and the second substrate base member 90 have the same planar profile (circle having partial flat) and a plurality of section (chip section 61) to be a pressure sensor chip 10 is allocated inside of the planar profile.

The respective chip section 61 on the laminated wafer 60 is divided by an imaginary grid border 62.

In the border 62, borders 62A lining in vertical direction in FIG. 7 are disposed at an interval corresponding to a length from the extension 42 of the lower glass 40 to the remote side thereof. In practice, the interval is slightly wider corresponding to the width lost by below-mentioned cutting process. Borders 62B lining in lateral direction in FIG. 7 are disposed at an interval corresponding to a length of the extension 42 of the lower glass 40 in parallel direction thereof (width not including the extension 42).

Necessary elements for the pressure sensor chip 10 are formed on respective chip sections 61 of the laminated wafer 60.

Respective sections on the first substrate base member 80 correspond to the upper glass 30 of the pressure sensor chip 10 and the elements of the upper glass 30 (central electrode 31 and leading portion 38) are formed in each section.

Respective sections on the electrode layer base member 70 correspond to the electrode layer 20 of the pressure sensor chip 10 and the diaphragm 21 is formed by etching both sides in each section.

Respective sections on the second substrate base member 90 correspond to the lower glass 40 of the pressure sensor chip 10 and the pressure inlet 41 is formed in each section.

The leading portion 38 of the upper glass 30 connects the chip sections 61 arranged in the border 62A direction. In other words, the first leading portion 38A of one chip section 61 is connected to the second leading portion 38B and the third leading portion 38C of adjacent chip section 61 via the fourth leading portion 38D.

The fourth leading portion 38D for connection is disposed on the border 62B and is removed in cutting off the chip section 61 along the border 62B.

The first substrate base member 80, the electrode layer base member 70 and the second substrate base member 90 laminated as a laminated wafer 60 are kept in a position where respective chip sections 61 accurately correspond with each other and are fixed by anodic-bonding.

An anodic-bonding electrode 83 is formed on the surface of the first substrate base member 80 for conducting the anodic-bonding. The anodic-bonding electrode 83 includes a trunk-line electrode 83A extending along the border 62A and a branch-line electrode 83B branched from the trunk-line electrode 83A and extending along the border 62B. Incidentally, the branch-line electrode 83B is divided with each other and the fourth leading portion 38D is disposed on the divided portion.

An end of the trunk-line electrode 83A (upper portion in FIG. 7) is respectively connected to a distributing portion 85A, and the distributing portion 85A is connected to an impressing portion 85 on a minus-side.

Since the trunk-line electrode 83A and the branch-line electrode 83B are disposed on the border 62 of the chip section 61, the trunk-line electrode 83A and the branch-line electrode 83B are removed in cutting off the chip sections 61 without remaining on the pressure sensor chip 10.

The anodic-bonding is conducted by applying a minus-voltage to the anodic-bonding electrode 83 and a plus-voltage to the electrode layer base member 70, so that the first substrate base member 80 and the electrode layer base member 70 are anodically-bonded in accordance with the pattern of the anodic-bonding electrode 83. In order to eliminate the possibility of damage of the thin diaphragm 21 by being electrically attracted to the first substrate base member 80, the central electrode 31 and the peripheral electrode 32 of the first substrate base member 80 are made to be a plus pole as in the electrode layer base member 70.

A plus-voltage is supplied to respective chip sections 61 through the leading portion 38. The leading portions 38 of the respective chip sections 61 is connected with each other as mentioned above, and an end (lower portion in FIG. 7) are connected to a distributing portion 82A, the distributing portion 82A being connected to an impressing portion 82 on the plus side.

A groove 110 for forming the extension 42 is formed on the border 62A of the chip section 61 facing the signal receiving portion 34 and the through-hole 36 on the laminated wafer 60.

The groove 110 is formed by cutting the laminated wafer 60 at a depth from the first substrate base member 80 to the electrode layer base member 70 and at a predetermined width along the corresponding border 62A. A pair of the extension 42 is formed by cutting along the center line of the bottom (i.e. the border 62A).

[Manufacturing Process]

A process for manufacturing the laminated wafer 60 and a process for manufacturing the pressure sensor chip 10 using the laminated wafer 60 will be described below.

The manufacturing process of the pressure sensor chip 10 comprises following steps of forming respective layer of the laminated wafer, anodically-bonding the respective layers, forming the groove, forming the signal receiving portion and cutting as the sensor chip.

The laminated wafer layers forming step is conducted as follows.

The diaphragm 21 of the electrode layer base member 70 is formed on a silicon wafer of a predetermined profile and thickness at a predetermined arrangement by conducting etching and the like.

The signal receiving portions 34 and 35, the leading portion 38, the anodic-bonding electrode 83 and the like of the first substrate 80 are formed on a glass substrate of a predetermined profile and thickness by forming a hole for the through-holes 36 and 37 at a predetermined arrangement and by vapor deposition and etching of the conductive layer.

The pressure inlet 41 of the second substrate base member 90 is formed at a predetermined arrangement on a glass substrate having a predetermined profile and thickness.

Accordingly, the electrode layer base member 70, the first substrate base member 80 and the second substrate base member 90 having the pattern of a plurality of the chip section 61 are manufactured.

The respective layers anodic-bonding step is conducted as follows.

The pre-manufactured electrode layer base member 70, the first substrate base member 80 and the second substrate base member 90 is located and laminated on a conductive table 100 for anodic-bonding (see FIG. 6), so that respective patterns adjust with each other.

A conductor 101 of the power supply (not shown) on a plus side is connected to the impressing portion 82 and the branch line is abutted to the electrode layer base member 70 through an opening 86 of the first substrate base member 80.

A conductor 102 on a minus-side of the power supply is connected to the impressing portion 85 and is abutted to the table 100.

Under the condition, the table 100 is kept in a high temperature of approximate 400° C. and voltage of approximate 400V is impressed between the respective conductors 101 and 102, so that the electrode layer base member 70, the first substrate base member 80 and the second substrate base member 90 are anodically-bonded.

Accordingly, the laminated wafer 60 is manufactured. However, the groove 110 is not formed yet.

The groove forming step is conducted as follows.

Figure 8:
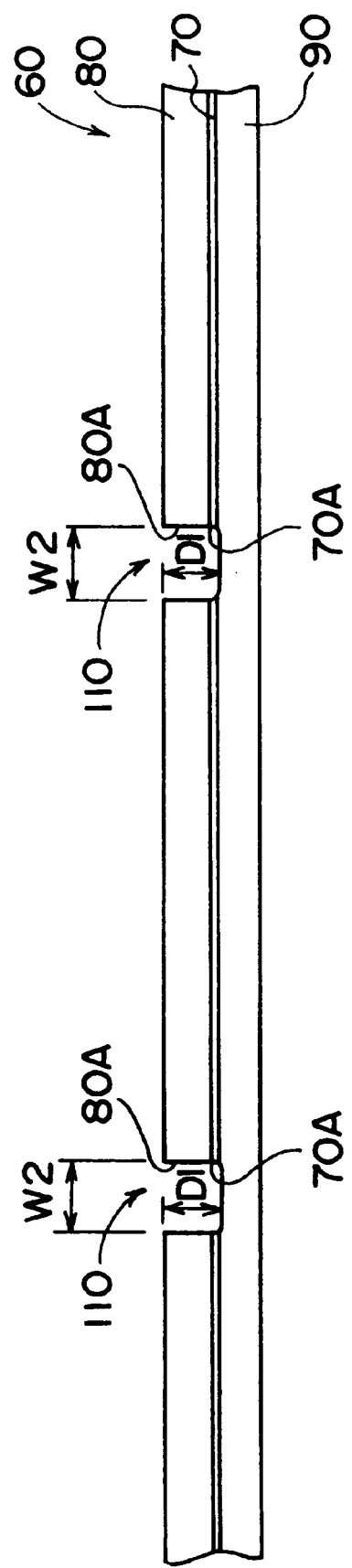
FIG. 8 is a side elevation showing groove forming state of the laminated wafer of FIG. 6.

As shown in dotted line in FIG. 7, the groove 110 shown in FIG. 8 is formed by cutting along the border 62A. Any conventional cutting tool may be used for the cutting.

It is necessary that the width of the groove 110 is slightly wider than a double width of the extension 42 of the pressure sensor chip 10 for forming a pair of extension 42 in an opposing manner by cutting the groove 110 in half. Incidentally, the trunk-line electrode 83A of the anodic-bonding electrode 83 disposed on the border 62A is completely removed from the laminated wafer 60 by carving the groove 110.

The depth of the groove 110 is set so that the groove reaches from the first substrate base member 80 to the electrode layer base member 70 slightly grinding the surface of the second substrate base member 90. Accordingly, an end 70A of the electrode layer base member 70 and an end 80A of the first substrate base member 80 are respectively exposed inside the groove 110.

A width W2 of the groove 110 is 0.5 to 2.0 times as long as depth D1, more preferably, 0.7 to 1.3 times as long as the depth D1. The evaporated metal does not get to the bottom when the width is shorter than 0.5 times of the depth D1 because the width of the groove 110 is too thin. On the other hand, the number of the pressure sensor chip 10 largely decreases when the width is larger than 2.0 times of the depth because the interval between the chip sections 61 widens.

Incidentally, the height H1 of the extension 42 and the depth D1 of the groove 110 is substantially the same in the present embodiment.

The signal receiving portion is formed as follows.

A plurality of the chip sections 61 is arranged on the laminated wafer 60 and there are many point where four corners of the chip section 61 concentrate. In these points, the comers 30D are facing the groove 110. Accordingly, the signal receiving portion 50 is formed on the points where four corners of the chip section 61 concentrate facing the groove 110.

The signal receiving portion 50 is formed by vapor depositing conductive metal. In this case, a cover is attached on the surface of the laminated wafer 60 for avoiding the vapor deposition to unnecessary parts.

Figure 9:
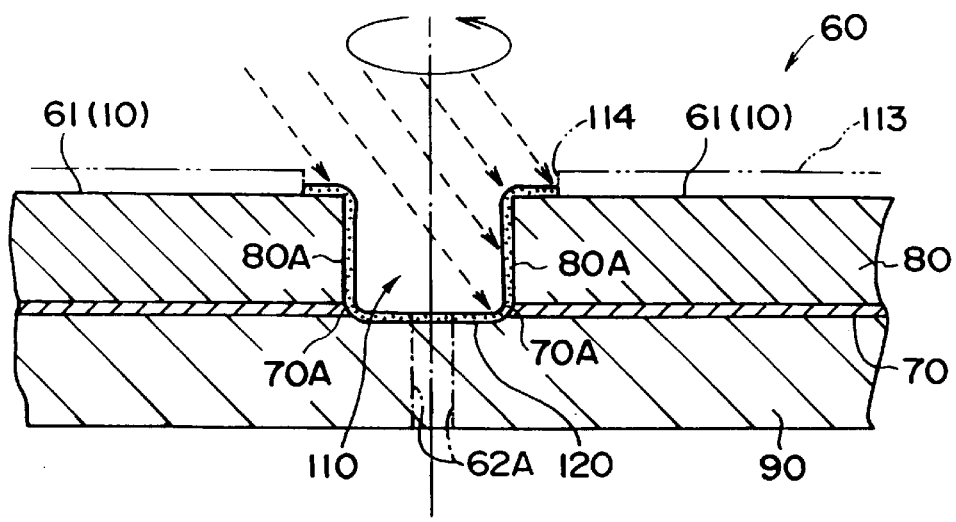
FIG. 9 is a cross section showing vapor deposition of a conductive layer to the laminated wafer of FIG. 6.
Figure 10:
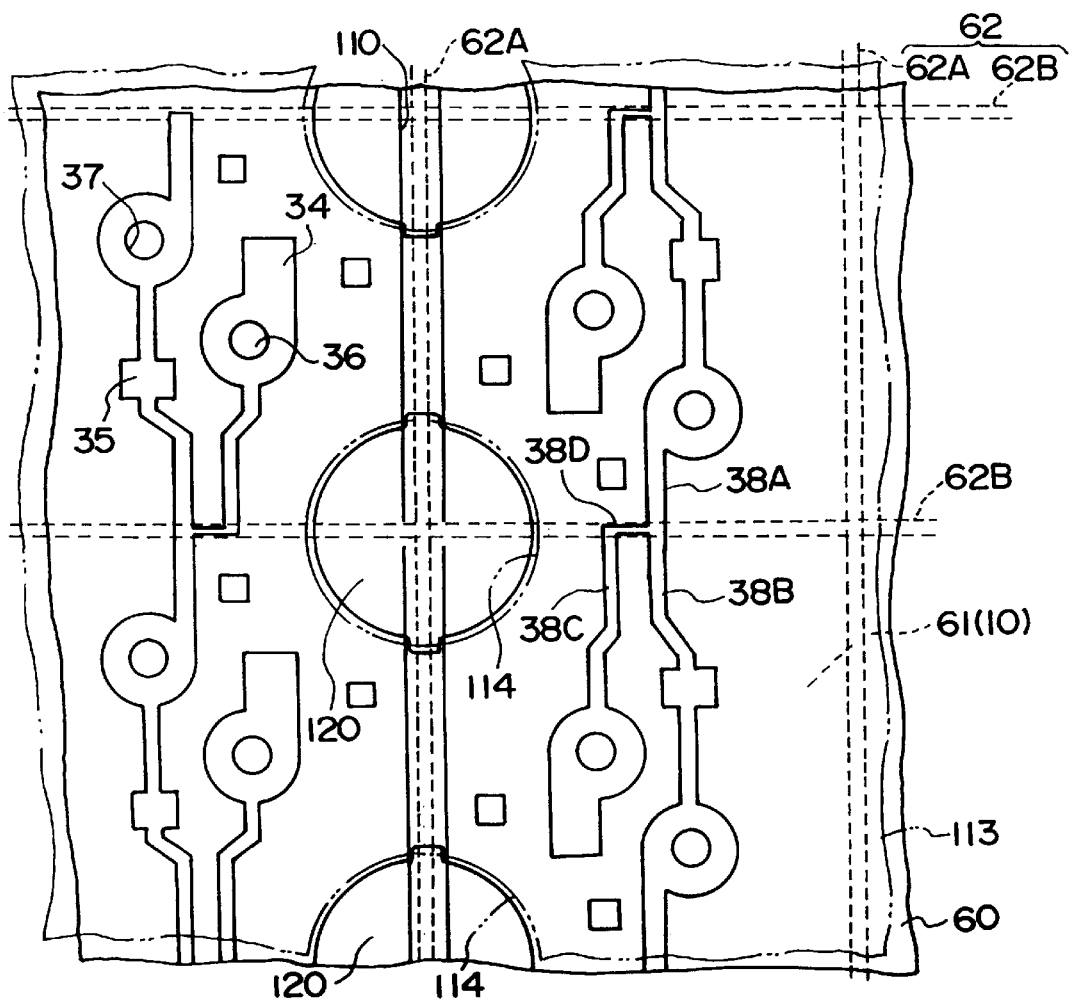
FIG. 10 is a top plan view showing vapor deposition of a conductive layer to the laminated wafer of FIG. 6.

More specifically, a metal mask 113 shown in double dotted line is attached on the laminated wafer 60 as shown in FIGS. 9 and 10. A circular cut 114 of the metal mask 113 is adjusted to be positioned to the point where four corners 30D forming the signal receiving portion 50 and a part of the respective chip section 61 are exposed.

In this state, the vapor deposition is conducted using an evaporation source (not shown) to the laminated wafer 60. The vapor deposition base member is sprayed from the evaporation source to the circular cut 114 in a direction of, for instance, obliquely 45 degrees (see dotted arrow in FIG. 9) upwardly. Simultaneously, the laminated wafer 60 and/or the evaporation source is rotated around perpendicular axis as shown in upper arrow in FIG. 9, thereby thoroughly depositing inside the groove 110.

Accordingly, a continuous conductive layer 120 is formed on the bottom of the groove 110 (surface of the second substrate base member 90), the side of the groove 110 (the end 70A of the electrode layer base member 70 and the end 80A of the first substrate base member 80) and the surface of the first substrate base member 80 exposed from the circular cut 114.

The layer thickness of the conductive layer 120 is not specifically limited, and is approximately 2.4 $\mu$m, for instance.

The laminated wafer 60 with the conductive layer 120 is sintered at approximately 400° C. to strengthen the contact and electric bonding between the conductive layer 120 and the electrode layer base member 70 and the like.

The sensor chip is cut off as follows.

The laminated wafer 60 is cut along all the borders 62 with a thin rotary whetstone or a cutting tool.

In the cutting off process, the width of the cut is sufficiently smaller Ethan the width of the cutting tool used for carving the groove 110. For example, a cutting tool having edge width of cutting margin shown in single dotted line in FIG. 9 is used.

The chip section 61 is separately cut off from the laminated wafer 60, thereby obtaining the pressure sensor chip 10.

In the process, the conductive layer 120 formed to the point where four chip sections 61 concentrate is divided into four, which forms the signal receiving portion 50 connected to the diaphragm 21 in respective pressure sensor chip 10.

Simultaneously, the bottom of the groove 110 is cut at the center thereof, which forms the extension 42 of the respective pressure sensor chip 10.

Incidentally, the cutting width of the cutting tool used for the cutting process is set larger than the width of the anodic-bonding electrode 83 and the trunk-line electrode 83A and the branch-line electrode 83B of the anodic-bonding electrode are completely removed by cutting along the border 62. The fourth leading portion 38D is also removed.

Accordingly, the pressure sensor chip 10 is manufactured.

[Effect]

According to the above embodiment, following effects can be obtained.

1) Since the lower glass 40 of the pressure sensor chip 10 has the extension 42 and the conductive layer is formed from the surface 42A of the extension 42 to the upper surface 30B of the upper glass 30, the signal receiving portion 50 formed by the conductive layer does not touch a circuit substrate when the pressure sensor chip 10 is mounted to the circuit substrate, thereby preventing electric failure such noise pick-up through the signal receiving portion 50.

2) Since the signal receiving portion 50 is formed by the conductive layer, the cut 206 as in the conventional art is not required. Further, since the width W1 of the extension 42 is small, the size of the pressure sensor chip 10 can be reduced.

3) Since the width W1 of the extension 42 is more than 0.1 times as long as the height H1, a sufficient gap is formed between the cutting tool and respective ends 70A and 80A of the electrode layer base member 70 and the first substrate base member 80. Accordingly, when glass powders generated in cutting get in the gap, the glass powders can be securely discharged by ultra-pure water and the like used during the cutting process, and the conductive layer 120 formed on the ends 70A and 80A is not likely to be damaged. Further, since the width W1 is less than 0.9 times as long as the height H1, the size of the pressure sensor chip 10 does not get quite large, thereby enabling to obtain sufficient number of the pressure sensor chip 10 from the single laminated wafer 60.

4) Since the signal receiving portion 50 of the pressure sensor chip 10 is formed by vapor deposition on the laminated wafer 60 after the groove 110 being carved on the laminated wafer 60, the handling can be facilitated as compared to conventional art, in which independent pressure sensor chip 10 is attached to jigs, thereby reducing time required for the vapor deposition. Accordingly, the production cost of the pressure sensor chip 10 can be largely reduced.

5) Since the groove 110 is formed on the laminated wafer 60, the opening 207 of the conventional art is not required on the first substrate base member 80 and the first substrate base member 80 is not damaged. Accordingly, the conductive layer 120 extending continuously over respective ends 70A and 80A of the electrode layer base member 70 and the first substrate base member 80, the electric potential of the diaphragm 21 can be securely taken out, thereby improving reliability of the pressure sensor chip 10.

Further, since the process after being separated as a chip is reduced, foreign substance such as dust can be prevented from entering form the through-holes 36 and 37 and the pressure inlet 41, thereby improving yield rate of the pressure sensor chip 10.

6) Since the width W2 of the groove 110 is more than 0.5 times as long as the depth D1, the evaporated metal can securely reach the bottom of the groove 110, thereby obtaining conductive layer 120 of a uniform layer thickness. Further, since the width W1 is less than 2.0 times as long as the depth D1, the interval between the chip sections 61 is not largely widened, thereby enabling to obtain sufficient number of the pressure sensor chip 10 for the single laminated wafer 60.

7) Since the conductive layer 120 extends over the four chip sections 61, the vapor deposition process can be efficiently conducted.

Further, since the dividing process of the conductive layer 120 into respective chip sections 61 and main cutting process of the second substrate base member 90 are sequentially conducted, the cutting process can also be efficiently conducted.

8) Since the anodic-bonding electrode 83 is disposed on the border 62 of the chip section 61 and is kept within the range of the cutting width of the border 62 in cutting off the pressure sensor chip 10, the anodic-bonding electrode 83 is cut off simultaneously with the cutting of the pressure sensor chip 10 and the anodic-bonding electrode 83 is not retained on the surface of the obtained pressure sensor chip 10. Especially, the entire anodic-bonding electrode 83 is removed in the present embodiment.

Accordingly, the anodic-bonding electrode 83 does not hinder visual check of the anodic-bonding and automation by a checking apparatus can be smoothly applied.

Further, since the anodic-bonding electrode does not peel off and no contamination is caused as opposed to the conventional art, troublesome cleaning and check for marketing as a pressure sensor can be eliminated and reliability of the products can be enhanced.

[Second Embodiment]

Figure 11:
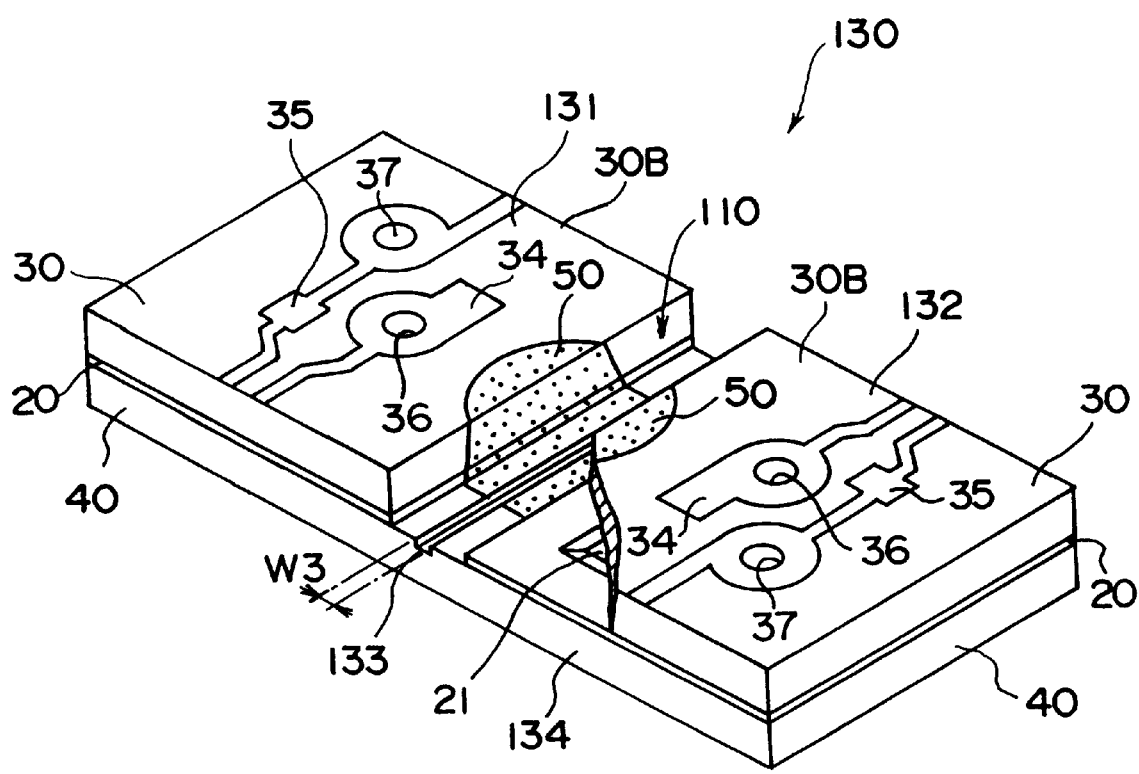
FIG. 11 is an entire perspective view showing a sensor chip according to second embodiment of the present invention.

A pressure sensor 130 according to the second embodiment of the present invention is shown in FIG. 11.

The pressure sensor 130 is a differential-pressure type having first pressure sensor 131 and second pressure sensor 132, which is so-called a combined-chip.

Incidentally, identical reference number is applied to the same component as the first embodiment and description thereof is omitted.

The pressure sensor 130 according to the present embodiment has an integral lower glass 134 as a common base of the first and the second pressure sensor 131 and 132 and the extension 42 described in the first embodiment is not provided. Further, the respective signal receiving portions 50 are not formed on the corner but is formed of conductive layer provided at an approximate center of the mutually opposing periphery.

The first pressure sensor 131 and the second pressure sensor 132 are arranged partially differently in the area, configuration, thickness (or one of them) of the diaphragm 21 (not shown), thereby being applicable to different pressure range by changing rigidity ratio of the diaphragm 21.

The manufacturing method of the pressure sensor 130 is identical with the manufacturing method described in the first embodiment until the groove 110 is formed.

The position of the circular cut 114 of the metal mask 113 shown in FIGS. 9 and 10 is set differently as in the first embodiment (shifting from the corner along the groove 110) and the conductive layer is formed in the state by vapor deposition. Subsequently, a dividing groove 133 is formed at the bottom of the groove 110 to form the two signal receiving portions 50. Further, the laminated wafer is cut along the border 62 shown in FIG. 7 except for the border 62 along the groove 110, thereby separating the pressure sensor 130 having the first and the second pressure sensors 131 and 132.

Accordingly, the shortly-cut groove 110 exists between the first and the second pressure sensors 131 and 132, the width being 0.5 to 2.0 times as long as the height.

According to the present embodiment, since the conductive layer is formed from the bottom of the groove 110, i.e. upper portion of the integral lower glass 134 to the upper surface 30B of the upper glass 30, the respective signal receiving portions 50 formed by the conductive layer does not reach lower periphery of the lower glass 134. Therefore, the electric failure in mounting the pressure sensor 130 to the circuit substrate can be prevented. Further, the size of the pressure sensor 130 can be reduced as compared with the conventional arrangement of the pressure sensor 130.

In other words, aforesaid effects 1) to 6) can be obtained by the arrangement similar to the first embodiment.

[Modification]

The scope of the present invention is not limited to the aforesaid embodiment but includes other arrangements as long as the object of the present invention can be attained. More specifically, following modifications etc. are also included within the scope of the present invention.

Figure 12:
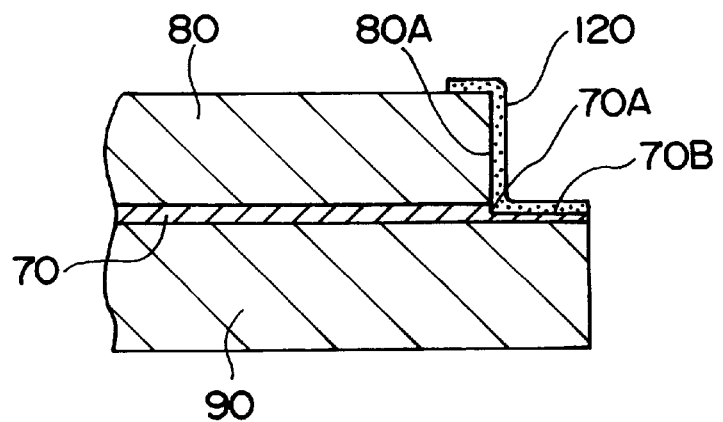
FIG. 12 is a cross section showing a modification of groove of laminated wafer of FIG. 6.
Figure 17:
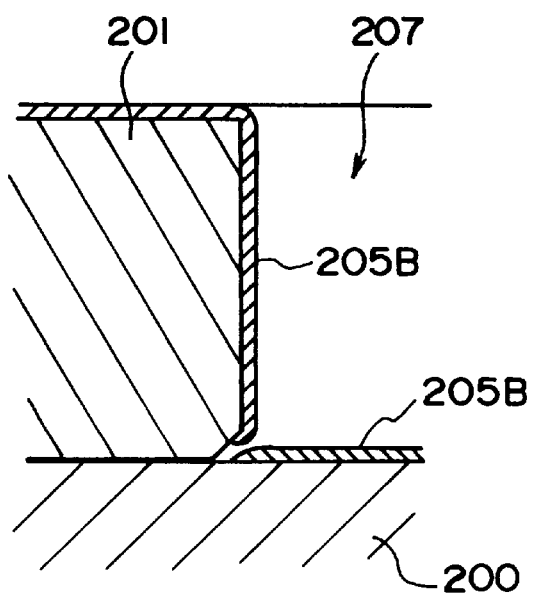
FIG. 17 is a cross section showing still another conventional art.

For instance, the groove 110 of the aforesaid embodiments has a depth slightly grinding the second substrate base member 90. However, the groove 110 may be stopped at the border of the electrode layer base member 70 and the second substrate base member 90. Further, the groove 110 is not required to reach the second substrate base member 90 but a part 70B of the electrode layer base member 70 may be retained on the bottom of the groove 110 as shown in FIG. 12. In this case, the extension 42 is a combination of the second substrate base member 90 and the part 70B of the electrode layer base member 70. It is only necessary that the electrode layer base member 70 is exposed on the bottom of the groove 110 such as border of the electrode layer base member 70 and the first substrate base member 80. In the above, the electrode layer base member 70 does not extend in flat with the end 80A of the first substrate base member 80 and there is apparent problem of continuously forming the signal receiving portion 50. However, since the bottom corner of the groove 110 is round-shaped by the carving process of the groove 110, the signal receiving portion 50 does not discontinue by the concave shown in FIG. 17. In short, what is required is that the signal receiving portion 50 and the electrode layer 20 is electrically connected.

Figure 15:
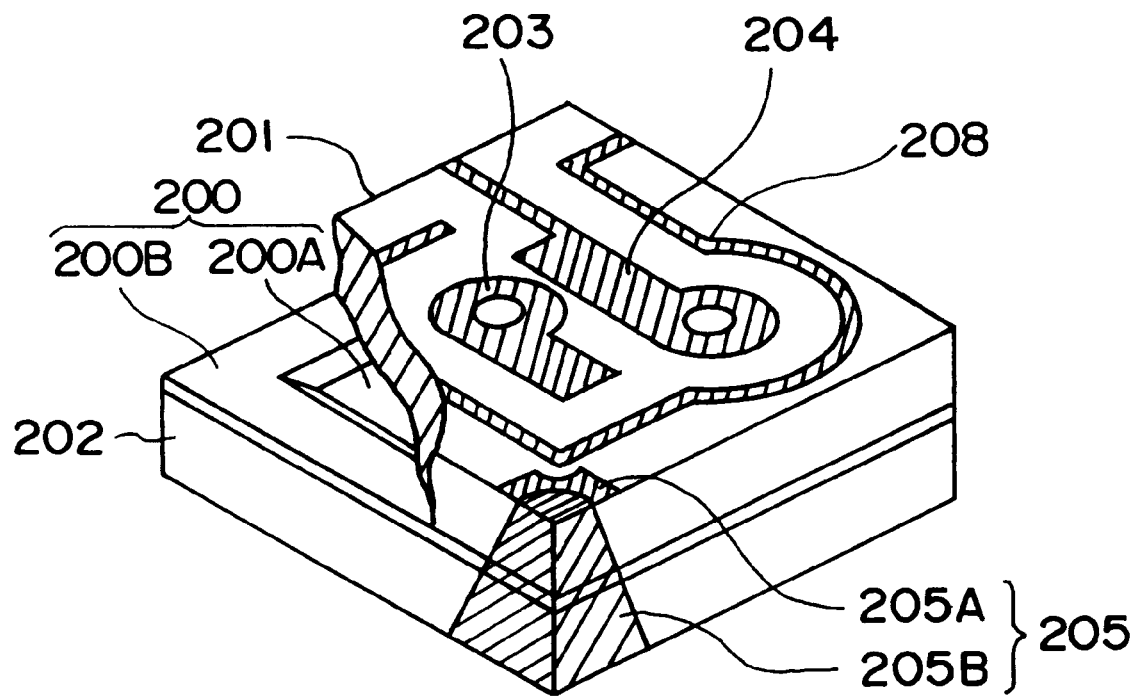
FIG. 15 is a perspective view showing a conventional art.
Figure 16:
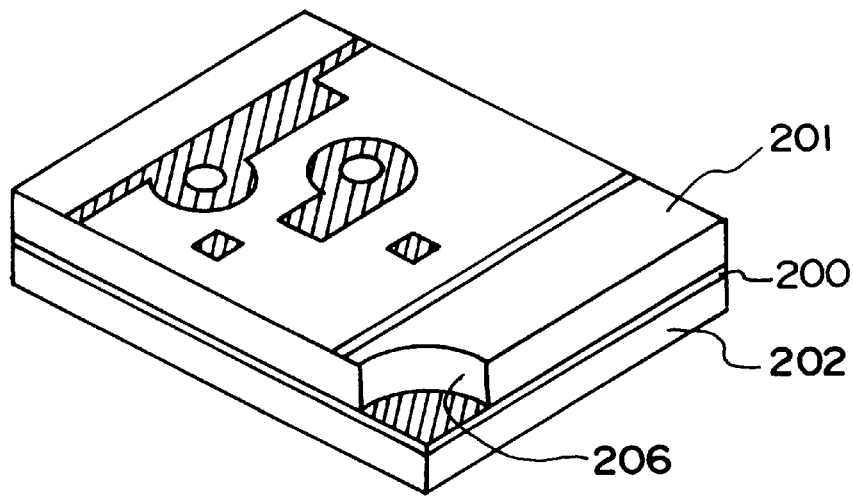
FIG. 16 is a perspective view showing another conventional art.

Though the signal receiving portion 50 is formed on a single side in the first embodiment, the signal receiving portion may be formed over two sides orthogonal with each other as shown in conventional art of FIG. 15. For the arrangement, the groove 110 may be formed in intersecting directions and vapor deposition should be conducted to the intersection. The arrangement may be optionally determined in view of the necessity as the sensor chip. In short, what is required is that the signal receiving portion 50 is formed to the upper glass 30 side relatively to the surface 42A of the extension 42.

The pressure sensor 130 is composed of the first and the second pressure sensors 131 and 132 in the second embodiment, however, the present invention includes provision of more pressure sensors onto an integral lower glass substrate.

The respective receiving portions 50 may be provided to the corner of the first and the second pressure sensors 131 and 132 as in the first embodiment. In the above arrangement, the signal receiving portion 50 can be efficiently formed on the adjacent pressure sensor 130.

The signal receiving portion of the sensor chip of the present invention may be formed by vapor deposition from the surface of the extension to the surface of the first substrate after cutting off the chip.

Similarly, the vapor-deposited conductive layer may not be cut to be divided into respective chips. For instance, the conductive layer may be divided by forming a thin masking in the groove and peeling off.

In the aforesaid embodiments, though the diaphragm 21 is continuously formed by the electrode layer 20 and is used as an electrode by itself, the diaphragm may be an insulator. In the above arrangement, the electrode may be formed by providing a conducting thin layer to the diaphragm by a technique of semi-conductor processing. A signal wiring may be led out from the electrode to the extension.

Further, the electrode according to the present invention is not restricted to diaphragm itself or electrodes formed on the diaphragm, but includes an electrode disposed on the intermediate layer of the multi-layered chip. Accordingly, the present invention can be applied to various sensors for measuring acceleration, flow rate, temperature etc. as well as pressure sensors and, in addition, other chips except for sensors.

Though the anodic-bonding electrode is entirely cut off by finally separating the sensor chip in the aforesaid embodiment, the anodic-bonding electrode may not be entirely removed but may be partially retained.

However, in order to avoid disadvantage caused by remaining anodic-bonding electrode, at least more than 60% of the anodic-bonding electrode length surrounding the entire circumference of the sensor chip is preferably removed (less than 40% is retained).

Figure 14:
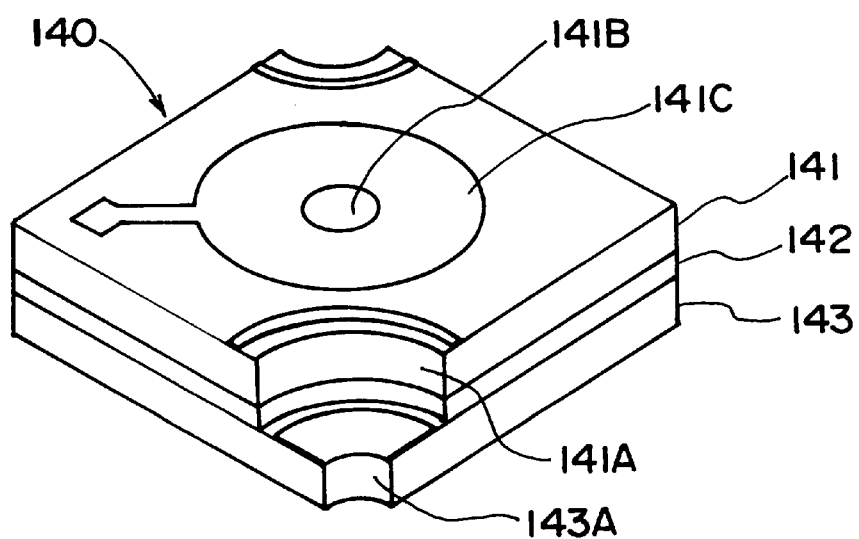
FIG. 14 is a perspective view showing a sensor chip manufactured from the laminated wafer of FIG. 12.

For instance, the pressure sensor chip 140 shown in FIG. 14 has first substrate 141, an electrode layer 142 and second substrate 143. The second substrate 143 has a through-hole 143A and the first substrate 141 has a cut 141A for exposing the through-hole 143A. A through-hole 141B is provided at the center of the first substrate 141 and an electrode 141C is formed therearound.

Figure 13:
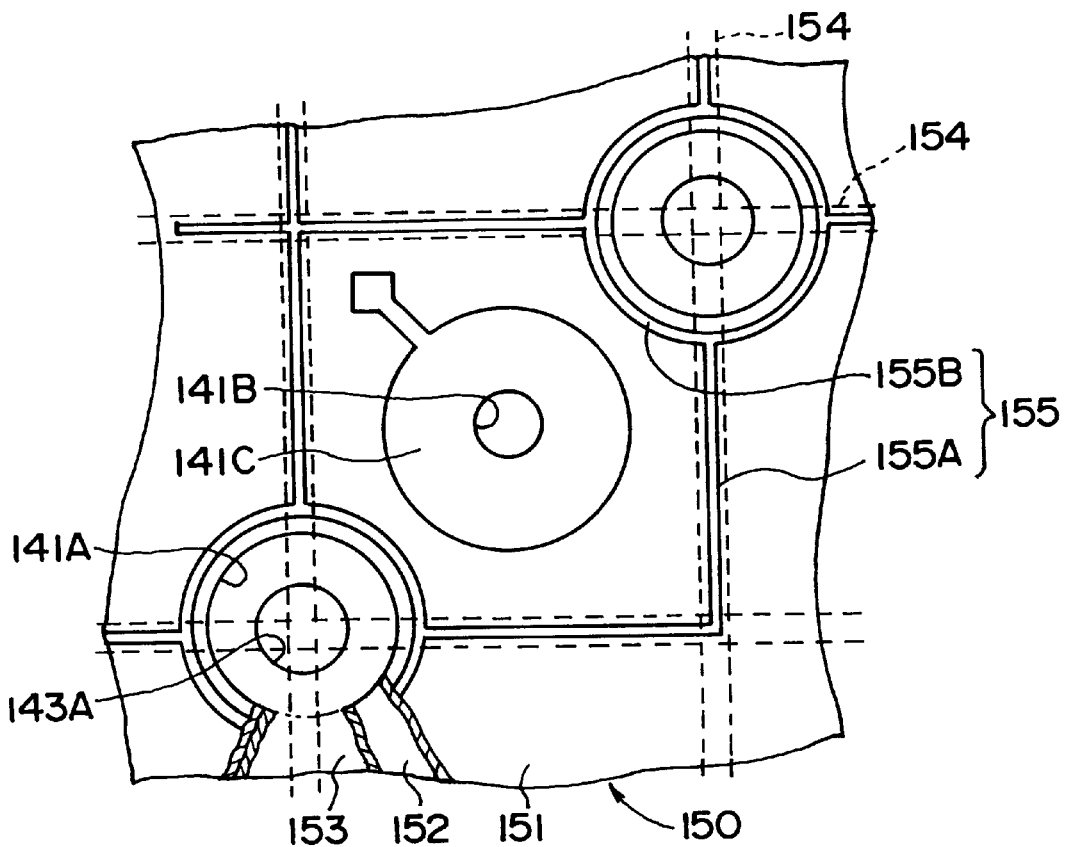
FIG. 13 is an enlarged top plan view showing a modification of surface pattern of the laminated wafer.

In order to manufacture the pressure sensor chip 140, a laminated wafer 150 has first substrate base member 151, electrode layer base member 152 and second substrate base member 153 laminated with each other as in the above-described embodiments. As shown in FIG. 13, the laminated wafer 150 may be cut off at a border 154 to obtain the sensor chip.

A hole corresponding to the cut 141A is required to be formed in advance on the first substrate base member 151. An anodic-bonding electrode 155 is used for conducting anodic-bonding. Periphery portion 155A of the electrode 155 extends along the border 154 and can be removed during cutting process. However, a curve 155B surrounding circumference of the cut 141A is retained on the pressure sensor chip 140 after the cutting process. However, since the curve 155B is designed sufficiently short, i.e. less than 40%, no problem occurs.

What is claimed is:

1. A manufacturing method of a sensor chip having laminated first substrate and second substrate, an electrode layer sandwiched between the substrates and signal receiving portion provided on a surface of the first substrate remote from the electrode layer, the signal receiving portion being led from the electrode layer, the method comprising the steps of:

forming a laminated wafer having base member of the second substrate and an array of a laminate of base member of the electrode layer and the first substrate disposed on the second substrate base member at a predetermined interval;

applying a cover to the laminated wafer, the cover having a cut with a pattern corresponding to a configuration of the signal receiving portion, to expose a part of inside of the groove and a part of the surface of the first substrate base member along the groove from the cut;

vaporizing and supplying a vapor deposition base member having conductivity to the cut to form a conductive layer extending continuously from a bottom of the groove exposed from the cut to the surface of the first substrate base member through a side thereof; and cutting an approximate center of the groove in width direction thereof with a smaller width than the width of the groove to divide into respective sensor chips.

2. The manufacturing method of a sensor chip according to claim 1, the forming laminated wafer step further comprising the steps of: laminating the second substrate base member large enough to allocate a plurality of sensor chip, the electrode layer base member and the first substrate base member; and forming the groove from the first substrate base member side to the electrode layer base member along a border of the sensor chip.

3. The manufacturing method of a sensor chip according to claim 2, wherein the laminated wafer is formed by locating at least four sensor chip sections to the laminated wafer so that respective corners of the sections concentrate to single point and by forming the groove along a border to divide the sensor chip sections into two pairs having at least two sections in the laminated wafer forming step;

wherein, in the cover applying step, the cut of the cover extends over the point where the four sensor chip sections concentrate and further extends continuously to the first substrate base member surfaces on both sides of the groove extending along the border; and wherein the laminated wafer is cut both along a center of the groove and in a direction intersecting the groove at the concentrating point of the corners to divide the conductive layer into four to form the signal receiving portion for each sensor chip sections after the conductive layer forming step.

4. The manufacturing method of a sensor chip according to claim 2, wherein the conductive layer is divided by a cutting tool, and wherein the second substrate base member is cut by the cutting tool subsequently to the conductive layer dividing step.

5. The manufacturing method of a sensor chip according to claim 2, wherein the width of the groove is set 0.5 to 2.0 times as long as the depth thereof.

6. The laminated wafer for sensor chip according to claim 5, further comprising an anodic-bonding electrode on a border of each section.

7. The laminated wafer for sensor chip according to claim 6, wherein the anodic-bonding electrode surrounds each section for approximately an entire circumference thereof and more than 60% of a length of the anodic-bonding electrode is located on the border.

8. The laminated wafer for sensor chip according to claim 6, wherein the anodic-bonding electrode is thinner than a cut width in cutting off each section along the border.

9. The manufacturing method of a sensor chip according to claim 2, wherein a plurality of sensor chip section is formed on the laminated wafer and an anodic-bonding electrode is disposed on the border; and wherein the anodic-bonding electrode is cut and removed in cutting each section as the sensor chip after being used for anodic-bonding.

10. The manufacturing method of a sensor chip according to claim 9, wherein the anodic-bonding electrode surrounds each section for approximately an entire circumference and more than 60% of a length of the anodic-bonding electrode is located on the border.

11. The manufacturing method of a sensor chip according to claim 9, wherein the anodic-bonding electrode is thinner than a cut width in cutting off each section along the border.

* * * * *